United States Patent
Gong et al.

(10) Patent No.: US 11,341,248 B2
(45) Date of Patent: May 24, 2022

(54) METHOD AND APPARATUS TO PREVENT UNAUTHORIZED OPERATION OF AN INTEGRATED CIRCUIT IN A COMPUTER SYSTEM

(71) Applicant: Intel Corporation, Santa Clara, CA (US)

(72) Inventors: Haifeng Gong, Shanghai (CN); Vasudevan Srinivasan, Portland, OR (US); Antonio J. Hasbun Marin, San Antonio de Belen (CR)

(73) Assignee: Intel Corporation, Santa Clara, CA (US)

( * ) Notice: Subject to any disclaimer, the term of this patent is extended or adjusted under 35 U.S.C. 154(b) by 639 days.

(21) Appl. No.: 16/229,496

(22) Filed: Dec. 21, 2018

(65) Prior Publication Data

US 2019/0114434 A1 Apr. 18, 2019

(51) Int. Cl.
*G06F 21/57* (2013.01)
*G06F 21/60* (2013.01)
*H04L 9/32* (2006.01)

(52) U.S. Cl.
CPC .......... *G06F 21/575* (2013.01); *G06F 21/602* (2013.01); *H04L 9/3263* (2013.01)

(58) Field of Classification Search
CPC ..... G06F 21/575; G06F 21/602; H04L 9/3263
See application file for complete search history.

(56) References Cited

U.S. PATENT DOCUMENTS

| | | | | |
|---|---|---|---|---|
| 2006/0107320 A1* | 5/2006 | Bhatt | .................... | G06F 21/575 726/22 |
| 2010/0082961 A1* | 4/2010 | Gurumoorthy | ....... | G06F 9/4401 713/2 |
| 2011/0087872 A1* | 4/2011 | Shah | .................... | G06F 21/572 713/2 |

* cited by examiner

*Primary Examiner* — Stefan Stoynov
(74) *Attorney, Agent, or Firm* — Compass IP Law, PC

(57) ABSTRACT

A system includes a processor coupled to an integrated circuit. The processor includes a non-volatile memory to store instructions to perform a boot process. The boot process is discontinued to prevent unauthorized use of the processor if a value received from the integrated circuit in response to a first value sent to the integrated is not valid.

20 Claims, 5 Drawing Sheets

METHOD AND APPARATUS TO PREVENT UNAUTHORIZED OPERATION OF AN INTEGRATED CIRCUIT IN A COMPUTER SYSTEM

BACKGROUND

A central processing unit (CPU) is electronic circuitry that carries out instructions of a computer program by performing operations specified by the instructions. A microprocessor incorporates the electronic circuitry of a central processing unit on a single integrated circuit. A system on a chip (SoC) is an integrated circuit that includes a CPU and other electronic circuitry such as graphics, memory, and Input/Output (I/O) control logic.

The integration of the CPU onto an integrated circuit reduces the cost of microprocessors and SoCs because integrated circuits can be produced in large numbers by highly automated processes, resulting in a low per-unit cost.

BRIEF DESCRIPTION OF THE DRAWINGS

Features of embodiments of the claimed subject matter will become apparent as the following detailed description proceeds, and upon reference to the drawings, in which like numerals depict like parts, and in which:

Figure 1:
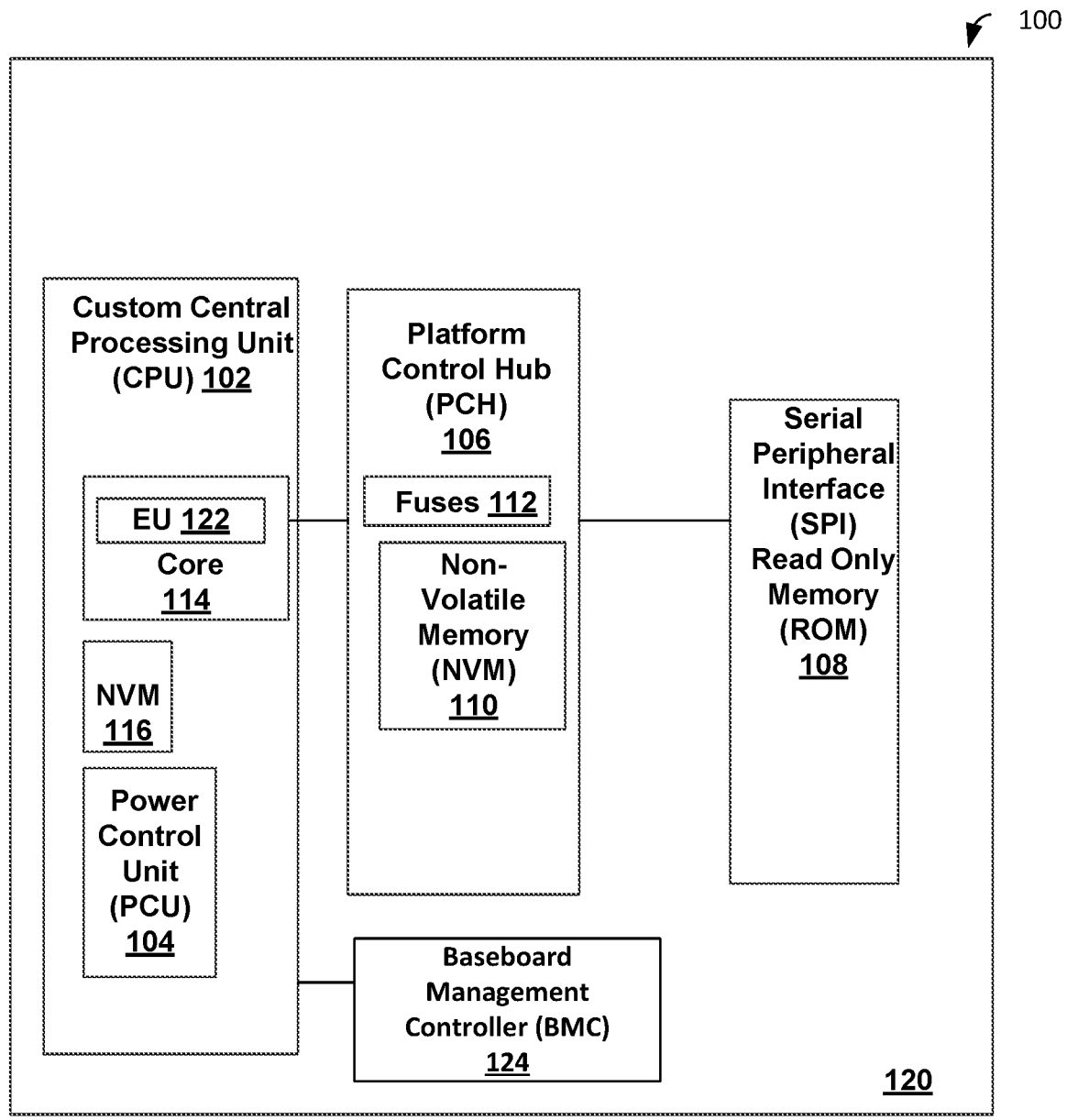
FIG. 1 is a block diagram of a printed circuit board in a computer system 100 that includes a Central Processing Unit (CPU)

Although the following Detailed Description will proceed with reference being made to illustrative embodiments of the claimed subject matter, many alternatives, modifications, and variations thereof will be apparent to those skilled in the art. Accordingly, it is intended that the claimed subject matter be viewed broadly, and be defined only as set forth in the accompanying claims.

DESCRIPTION OF EMBODIMENTS

A custom integrated circuit, for example a custom processor includes additional electronic circuitry to provide one or more functions that are not included in a standard processor. A custom integrated circuit is typically produced for a customer and shipped directly to that customer.

One method to prevent unauthorized use of an integrated circuit (for example, a custom integrated circuit or a non-custom processor shipped directly to a customer) is to manually track each integrated circuit from the location in which it is manufactured to the location in which it is used by the customer. The manual tracking of the integrated circuit involves a lot of logistic efforts, and is not practical when the integrated circuit is not directly ordered by the customer and is not directly shipped by the manufacturer of the integrated circuit to the customer.

Another method to prevent unauthorized use of the custom integrated circuit is to protect the computer system in which the custom integrated circuit is included on a motherboard while the computer system is in transit. For example, the custom integrated circuit can be a Central Processor Unit (CPU) on a motherboard that is installed in a server platform and the sever platform and the CPU are locked during transit. However, this method does not prevent the CPU from being removed from the server platform after the CPU and server platform are unlocked. Also, this method does not prevent the unauthorized use of the CPU in computer systems manufactured by others.

Another method to prevent unauthorized use of the custom integrated circuit is to store a unique identifier in the custom integrated circuit. The unique identifier can be a unique Stock Keeping Unit Identifier (SKU ID) or a Capability Identifier (Cap ID). In a system in which the custom integrated circuit is a CPU, firmware (for example, Basic Input/Output System (BIOS)) executed by the CPU to perform hardware initialization during power-on startup process (for example, system boot), the firmware can only perform the power-on startup process if the unique identifier is supported. However, this method does not prevent modifying the firmware to bypass the check of the unique identifier during the power-on startup process.

What is needed is a method to prevent unauthorized operation of a processor in a computer system. In an embodiment, an authentication based method to prevent unauthorized use of the processor in a platform is provided.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

A server is a computer or device that can be dedicated to managing network resources. Typically, a server can monitor performance metrics that include key performance indicators to understand the state of server. Performance metrics that can be monitored include Central Processor Unit (CPU) utilization, memory utilization and network throughput.

FIG. 1 is a block diagram of a printed circuit board 120 in a computer system 100 that includes a Central Processing Unit (CPU) 102. In an embodiment, the printed circuit board 120 is a motherboard and the computer system 100 is a server. A motherboard is a printed circuit board that includes components of a computer system 100, with connectors into which other printed circuit boards can be inserted. In the embodiment shown, the CPU 102 is an integrated circuit and may also be referred to as a processor. In another embodiment, CPU 102 can be a custom CPU that is shipped directly to a customer from the manufacturer of the CPU.

Public-key cryptography (asymmetric cryptography) is a cryptographic system that uses a pair of keys (public key, private key) to perform authentication. The public key and private key can be large numbers (for example, 256-bit or 384-bits used in Elliptic Curve Public Key Cryptography)

that are paired together but are not identical (asymmetric). The public key is shared, the private key is not shared.

In a public key signature system, a message can be combined with a private key to create a digital signature for the message. The corresponding public key can be used to verify that the digital signature is valid, that is, that the digital signature was generated by the owner of the corresponding private key.

The public key of a key pair is stored in the CPU 102 during the manufacturing process by means of fusing the public key into the non-volatile memory 116 by the manufacturer of the CPU 102. The public key can be stored in the CPU 102 through the use of fuses or in the non-volatile memory 110.

The manufacturer of the CPU 102 can combine a message with the private key of the key pair to create a digital signature (also referred to as a hash) on the message or the manufacturer of the CPU 102 can provide the private key to the manufacturer of the printed circuit board 120 to create a digital signature on the message. The digital signature may be referred to as a "product key hash" and the digital signature is unique to the CPU 102. The message can be a unique serial number assigned to the printed circuit board.

The product key hash can be stored in fuses 112 or non-volatile memory 110 that can be read only memory (ROM) or other types of non-volatile memory in a chipset, in a Baseboard Management Controller (BMC) 124 or in a Serial Peripheral Interface (SPI) read only memory (ROM) 108 on the printed circuit board 120.

A chipset is an integrated circuit that manages data flow on a motherboard between the CPU 102, memory and peripherals. In an embodiment the chipset is a Platform Controller Hub (PCH) 106. The PCH 106, BMC 124 and SPI are integrated circuits, the PCH 106 and BMC 124 are communicatively coupled to the CPU 102. The SPI ROM 108 is communicatively coupled to the PCH 106.

Figure 2:
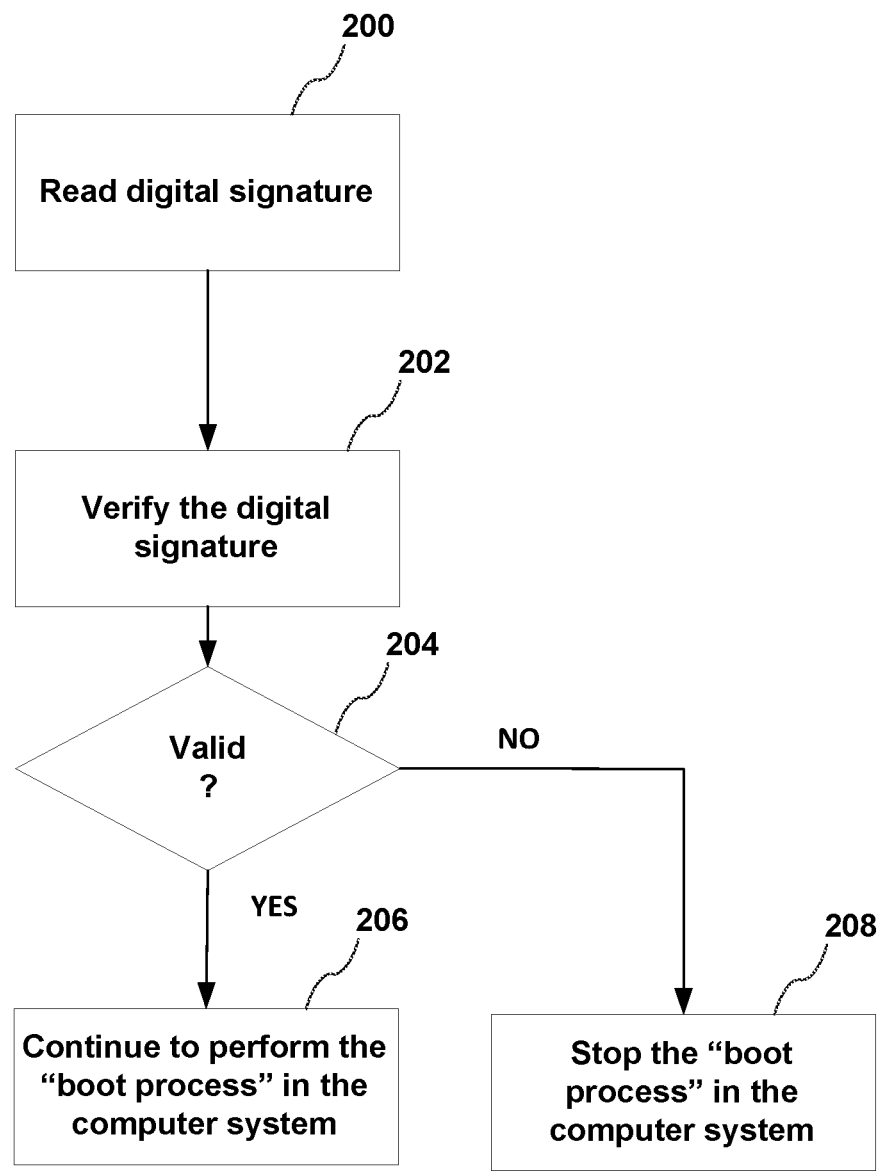
FIG. 2 is a flowgraph illustrating a method to prevent unauthorized operation of the CPU in a system.

The CPU 102 includes at least one core 114, a non-volatile memory 116 and a Power Control Unit 104. The core 114 includes an execution unit 122. Instructions (firmware) are stored in the non-volatile memory 116. FIG. 2 is a flowgraph illustrating a method to prevent unauthorized operation of the CPU 102 in a system.

At block 200, each time power is initially applied to the printed circuit board 120, the execution unit 122 in the core 114 executes instructions (firmware) stored in the non-volatile memory 116 in the CPU 102 to read the product key hash stored in fuses 112 or non-volatile memory 110 in the Platform Controller Hub 106. Processing continues with block 202.

At block 202, the execution unit in the core 114 executes one or more instructions to use the public key stored in non-volatile memory in the CPU 102 to verify the digital signature. Processing continues with block 204.

At block 204, if the digital signature is valid, processing continues with block 206. If not, processing continues with block 208.

At block 206, the core continues to execute instructions stored in the non-volatile memory to continue the "boot process" in the computer system 100. The "boot process" includes executing instructions from read only memory to start an operating system.

At block 208, the core stops executing instructions stored in the non-volatile memory to perform the "boot process" in the computer system because the printed circuit board 120 does not store a valid digital signature for the CPU 102.

As the CPU 102 only stores the public key for the key pair, and it is computationally infeasible to deduce the private key from the public key, reverse-engineering would be extremely difficult to allow the CPU 102 to be used in a computer system 100 that does not store the digital signature.

Figure 3:
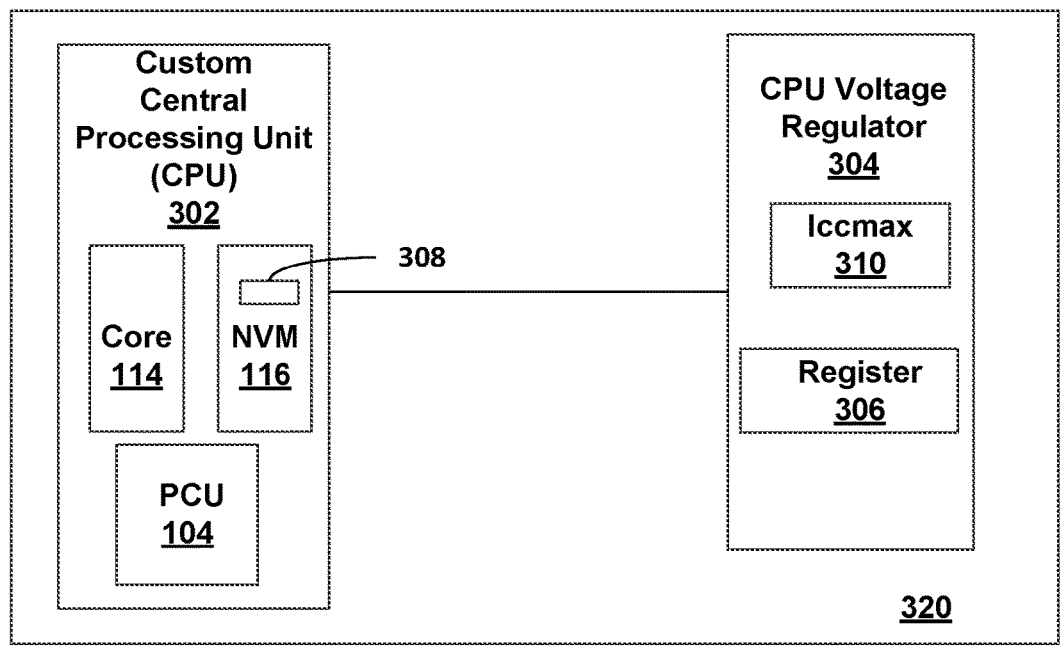
FIG. 3 is a block diagram of a printed circuit board in a computer system that includes a Central Processing Unit (CPU) and a CPU Voltage Regulator (VR)

FIG. 3 is a block diagram of a printed circuit board 320 in a computer system 300 that includes a Central Processing Unit (CPU) 302 and a CPU Voltage Regulator (VR) 304. A lower supply voltage helps to reduce CPU power dissipation. Some CPUs require a supply voltage that is less than 1.5 Volts. A CPU voltage regulator 304 (also called a processor power module (PPM)), is a buck converter that converts +5 Volts or +12 Volts to a lower voltage required by a CPU. A buck converter (step-down converter) is a Direct Current (DC)-to-DC power converter that steps down voltage from the input voltage to the output voltage (for example, 1.5 V) that is provided to the CPU. In addition to providing a fixed supply voltage to the CPU, a CPU voltage regulator 304 can sense the required supply voltage and continuously adjust the supply voltage.

The CPU VR 304 includes a register 306 that stores a unique identifier for use with the CPU 302. The unique identifier is assigned to the CPU 302. The unique identifier is also stored in a memory location 308 in non-volatile memory 116 in the CPU 302 or hard coded into a location in a non-volatile memory 116, for example, a Read Only Memory (ROM) in the CPU 302.

In another embodiment, instead of storing a unique identifier in a register, a maximum processor current (Iccmax) value that is stored in the CPU VR 304 can be fused into the CPU 302, during the manufacturing process.

Figure 4:
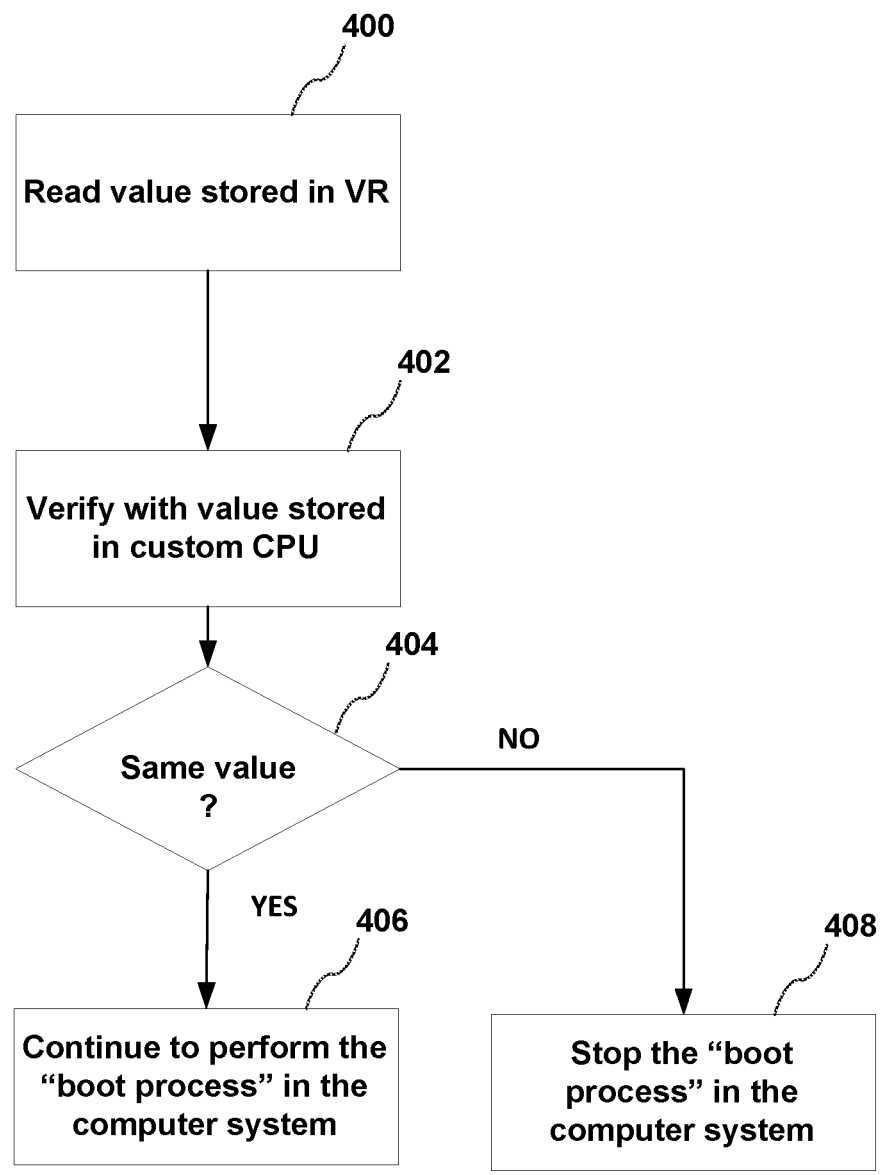
FIG. 4 is a flowgraph illustrating a method to prevent unauthorized operation of the CPU in a system that includes the CPU VR shown in FIG. 3.

FIG. 4 is a flowgraph illustrating a method to prevent unauthorized operation of the CPU 302 in a system that includes the CPU VR 304 shown in FIG. 3.

At block 400, each time power is initially applied to the printed circuit board 120, a core 114 executes instructions (firmware) stored in non-volatile memory 116 in the CPU 302 to read the unique identifier stored in register 306 or the value of the maximum processor current stored in register 310. Processing continues with block 402.

At block 402, the core 114 executes one or more instructions to read the unique identifier stored in the CPU 302 or the maximum processor current stored in the CPU 302. Processing continues with block 404.

At block 404, in an embodiment in which the maximum processor current is used to prevent unauthorized operation of the CPU 302, if both match, processing continues with block 206. If not, processing continues with block 408. In an embodiment in which the unique identifier is used to prevent unauthorized operation of the CPU 302, if both match, processing continues with block 206. If not, processing continues with block 408.

At block 406, the core continues to execute instructions stored in the non-volatile memory to continue the "boot process" in the computer system 300. The "boot process" includes executing instructions from read only memory to start an operating system.

At block 408, the core stops executing instructions stored in the non-volatile memory to perform the "boot process" in the computer system because the CPU VR 304 does not store the same unique identifier or the same maximum processor current for the CPU 302.

Figure 5:
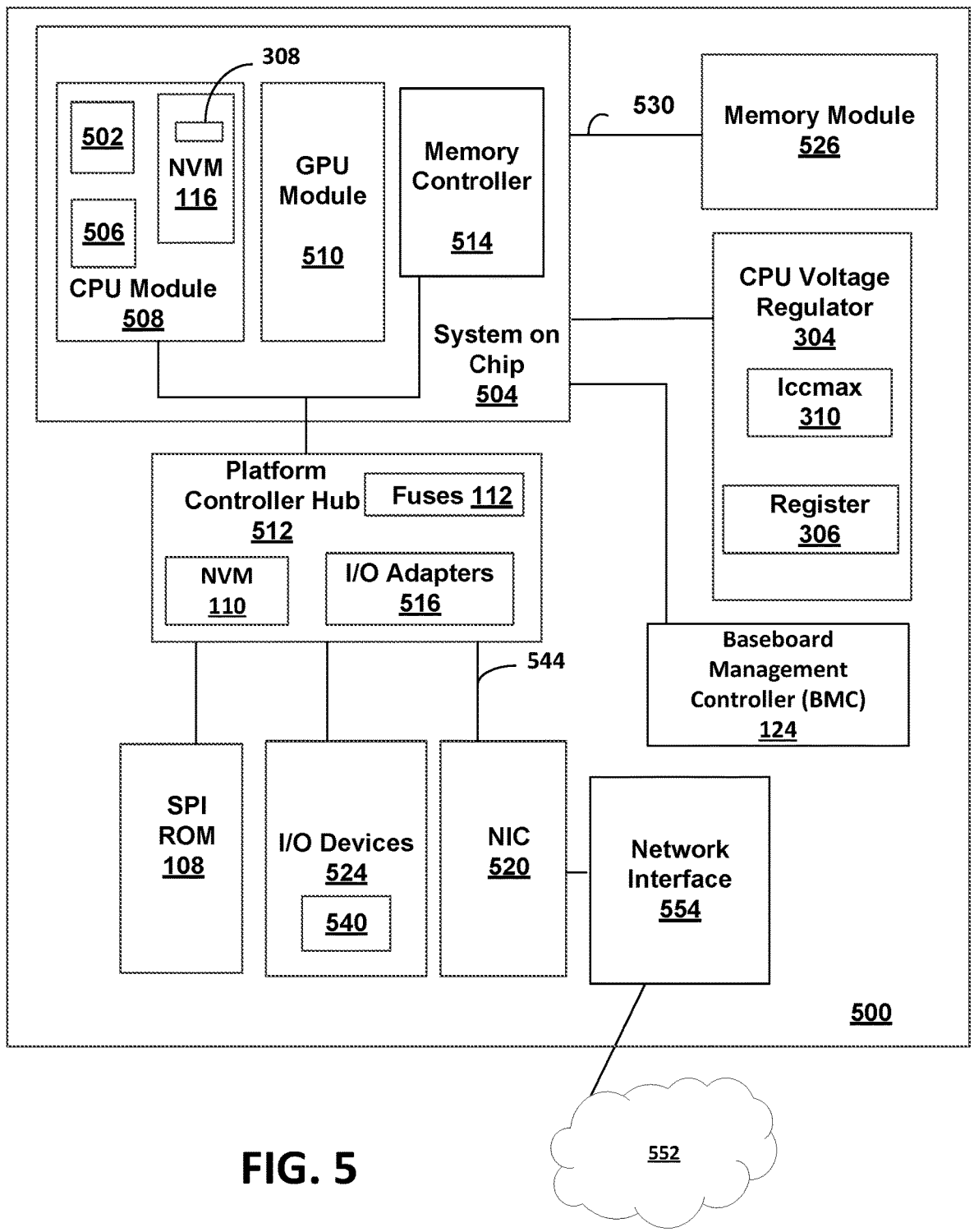
FIG. 5 is a block diagram of an embodiment of a computer system that includes a CPU.

FIG. 5 is a block diagram of an embodiment of a system 500 that includes a CPU module 508. System 500 can correspond to a computing device including, but not limited to, a server, a workstation computer, a desktop computer, a laptop computer, and/or a tablet computer.

System 500 includes a system on chip (SOC or SoC) 504 which combines processor, graphics, and memory control logic into one SoC 504. The SoC 504 includes at least one CPU module 508, a memory controller 514, and a Graphics Processor Unit (GPU) module 510. In other embodiments, the memory controller 514 can be external to the SoC 504. The CPU module 508 includes at least one processor core 502 and a level 2 (L2) cache 506. The CPU module 508 can include non-volatile memory 116 or a BMC 124 to store a public key of a key pair as discussed in conjunction with FIG. 1 and FIG. 2 or to store a unique identifier for the CPU module 508 in memory location 308 in the non-volatile memory 116 as discussed in conjunction with FIG. 3 and FIG. 4.

The CPU Voltage Regulator (VR) 304 that includes a register 306 to store a unique identifier in memory location 308 or register 310 to store a maximum processor current (Iccmax) value described in conjunction with FIG. 3 and FIG. 4 is coupled to the CPU module 508.

Although not shown, the processor core 502 can internally include one or more instruction/data caches (L1 cache), execution units, prefetch buffers, instruction queues, branch address calculation units, instruction decoders, floating point units, retirement units, etc. The CPU module 508 can correspond to a single core or a multi-core general purpose processor, such as those provided by Intel® Corporation, according to one embodiment. In an embodiment the SoC 504 can be an Intel® Xeon® Scalable Processor (SP), an Intel® Xeon® data center (D) SoC or an Intel® Atom® Processor.

The memory controller 514 can be communicatively coupled via a memory bus 530 to a memory module 526. The memory module 526 can be a volatile memory module that includes one or more volatile memory integrated circuits or a persistent memory module that includes one or more non-volatile memory integrated circuits or the memory module 526 can include both volatile and non-volatile memory integrated circuits. The memory module 626 can be a dual-in-line memory module (DIMM) or a small outline dual in-line memory module (SO-DIMM).

A non-volatile memory (NVM) device is a memory whose state is determinate even if power is interrupted to the device. In one embodiment, the NVM device can comprise a block addressable memory device, such as NAND technologies, or more specifically, multi-threshold level NAND flash memory (for example, Single-Level Cell ("SLC"), Multi-Level Cell ("MLC"), Quad-Level Cell ("QLC"), Tri-Level Cell ("TLC"), or some other NAND). A NVM device can also comprise a byte-addressable write-in-place three dimensional cross point memory device, or other byte addressable write-in-place NVM device (also referred to as persistent memory), such as single or multi-level Phase Change Memory (PCM) or phase change memory with a switch (PCMS), NVM devices that use chalcogenide phase change material (for example, chalcogenide glass), resistive memory including metal oxide base, oxygen vacancy base and Conductive Bridge Random Access Memory (CB-RAM), nanowire memory, ferroelectric random access memory (FeRAM, FRAM), magneto resistive random access memory (MRAM) that incorporates memristor technology, spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

Volatile memory is memory whose state (and therefore the data stored in it) is indeterminate if power is interrupted to the device. Dynamic volatile memory requires refreshing the data stored in the device to maintain state. One example of dynamic volatile memory includes DRAM (Dynamic Random Access Memory), or some variant such as Synchronous DRAM (SDRAM). A memory subsystem as described herein can be compatible with a number of memory technologies, such as DDR3 (Double Data Rate version 3, original release by JEDEC (Joint Electronic Device Engineering Council) on Jun. 27, 2007). DDR4 (DDR version 4, initial specification published in September 2012 by JEDEC), DDR4E (DDR version 4), LPDDR3 (Low Power DDR version 3, JESD209-3B, August 2013 by JEDEC), LPDDR4) LPDDR version 4, JESD209-4, originally published by JEDEC in August 2014), WIO2 (Wide Input/Output version 2, JESD229-2 originally published by JEDEC in August 2014, HBM (High Bandwidth Memory, JESD325, originally published by JEDEC in October 2013, DDR5 (DDR version 5, currently in discussion by JEDEC), LPDDR5 (currently in discussion by JEDEC), HBM2 (HBM version 2), currently in discussion by JEDEC, or others or combinations of memory technologies, and technologies based on derivatives or extensions of such specifications. The JEDEC standards are available at www.jedec.org.

The Graphics Processor Unit (GPU) module 510 can include one or more GPU cores and a GPU cache which can store graphics related data for the GPU core. The GPU core can internally include one or more execution units and one or more instruction and data caches. Additionally, the Graphics Processor Unit (GPU) module 510 can contain other graphics logic units that are not shown in FIG. 5, such as one or more vertex processing units, rasterization units, media processing units, and codecs.

Within the PCH 512, one or more I/O adapter(s) 516 are present to translate a host communication protocol utilized within the processor core(s) 502 to a protocol compatible with particular I/O devices. Some of the protocols that I/O adapter(s) 516 can be utilized for translation include Peripheral Component Interconnect (PCI)-Express (PCIe); Universal Serial Bus (USB); Serial Advanced Technology Attachment (SATA) and Institute of Electrical and Electronics Engineers (IEEE) 1594 "Firewire".

The I/O adapter(s) 516 can communicate with external I/O devices 524 which can include, for example, user interface device(s) including a display and/or a touch-screen display 540, printer, keypad, keyboard, communication logic, wired and/or wireless, storage device(s) including hard disk drives ("HDD"), solid-state drives ("SSD"), removable storage media, Digital Video Disk (DVD) drive, Compact Disk (CD) drive, Redundant Array of Independent Disks (RAID), tape drive or other storage device. The storage devices can be communicatively and/or physically coupled together through one or more buses using one or more of a variety of protocols including, but not limited to, SAS (Serial Attached SCSI (Small Computer System Interface)), PCIe (Peripheral Component Interconnect Express), NVMe (NVM Express) over PCIe (Peripheral Component Interconnect Express), and SATA (Serial ATA (Advanced Technology Attachment)). A Peripheral Component Interconnect Express (PCIe) adapter can be communicatively coupled over bus 544 to a network interface controller (NIC) 520.

The Platform Controller Hub (PCH) 512 can include Input/Output (I/O) adapters 516 that can include a Peripheral Component Interconnect Express (PCIe) adapter that is communicatively coupled over bus 544 to the NIC 520. The PCH 512 can also include fuses 112 and non-volatile memory 110 to store the product key hash as discussed in conjunction with FIG. 1.

The NIC 520 can be coupled to a network interface 554 to transmit/receive data over network 552. Additionally, there can be one or more wireless protocol I/O adapters. Examples of wireless protocols, among others, are used in personal area networks, such as IEEE 802.15 and Bluetooth, 4.0; wireless local area networks, such as IEEE 802.11-based wireless protocols; and cellular protocols.

It is envisioned that aspects of the embodiments herein can be implemented in various types of computing and networking equipment, such as switches, routers and blade servers such as those employed in a data center and/or server farm environment. Typically, the servers used in data centers and server farms comprise arrayed server configurations such as rack-based servers or blade servers. These servers are interconnected in communication via various network provisions, such as partitioning sets of servers into Local Area Networks (LANs) with appropriate switching and routing facilities between the LANs to form a private Intranet. For example, cloud hosting facilities can typically employ large data centers with a multitude of servers. Each blade comprises a separate computing platform that is configured to perform server-type functions, that is, a "server on a card." Accordingly, each blade includes components common to conventional servers, including a main printed circuit board (main board) providing internal wiring (i.e., buses) for coupling appropriate integrated circuits (ICs) and other components mounted to the board. These components can include the components discussed earlier in conjunction with FIG. 5.

In another embodiment, the NIC 520 can include non-volatile memory to store a public key of a key pair as discussed in conjunction with FIG. 1 and FIG. 2 or to store a unique identifier for the NIC 520 as discussed in conjunction with FIG. 3 and FIG. 4.

Flow diagrams as illustrated herein provide examples of sequences of various process actions. The flow diagrams can indicate operations to be executed by a software or firmware routine, as well as physical operations. In one embodiment, a flow diagram can illustrate the state of a finite state machine (FSM), which can be implemented in hardware and/or software. Although shown in a particular sequence or order, unless otherwise specified, the order of the actions can be modified. Thus, the illustrated embodiments should be understood only as an example, and the process can be performed in a different order, and some actions can be performed in parallel. Additionally, one or more actions can be omitted in various embodiments; thus, not all actions are required in every embodiment. Other process flows are possible.

To the extent various operations or functions are described herein, they can be described or defined as software code, instructions, configuration, and/or data. The content can be directly executable ("object" or "executable" form), source code, or difference code ("delta" or "patch" code). The software content of the embodiments described herein can be provided via an article of manufacture with the content stored thereon, or via a method of operating a communication interface to send data via the communication interface. A machine readable storage medium can cause a machine to perform the functions or operations described, and includes any mechanism that stores information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). A communication interface includes any mechanism that interfaces to any of a hardwired, wireless, optical, etc., medium to communicate to another device, such as a memory bus interface, a processor bus interface, an Internet connection, a disk controller, etc. The communication interface can be configured by providing configuration parameters and/or sending signals to prepare the communication interface to provide a data signal describing the software content. The communication interface can be accessed via one or more commands or signals sent to the communication interface.

Various components described herein can be a means for performing the operations or functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc.

Besides what is described herein, various modifications can be made to the disclosed embodiments and implementations of the invention without departing from their scope.

Therefore, the illustrations and examples herein should be construed in an illustrative, and not a restrictive sense. The scope of the invention should be measured solely by reference to the claims that follow.

What is claimed is:

1. A processor comprising:
a non-volatile memory to store instructions to perform a boot process; and
an execution unit to execute the instructions stored in the non-volatile memory to perform the boot process, the instructions to read a first value stored in the non-volatile memory and to send the first value to an integrated circuit communicatively coupled to the processor, the execution unit to discontinue the boot process if a second value received from the integrated circuit in response to the first value is not valid to prevent unauthorized use of the processor.

2. The processor of claim 1, wherein the first value is a public key and the second value is a digital signature.

3. The processor of claim 2, wherein the integrated circuit is a chipset.

4. The processor of claim 2, wherein the integrated circuit is a baseboard management controller.

5. The processor of claim 1, wherein the integrated circuit is a voltage regulator.

6. The processor of claim 5, wherein the first value is not valid if the first value is not equal to the second value.

7. The processor of claim 6, wherein the second value is a maximum processor current.

8. The processor of claim 6, wherein the second value is a number.

9. A method comprising:
executing, by an execution unit in a processor, instructions stored in non-volatile memory to perform a boot process, the instructions to:
read a first value stored in a non-volatile memory;
send the first value to an integrated circuit communicatively coupled to the processor;
determine if a second value received from the integrated circuit in response to the first value is not valid; and upon determining that the second value is not valid, discontinue the boot process to prevent unauthorized use of the processor.

10. The method of claim 9, wherein the first value is a public key and the second value is a digital signature.

11. The method of claim 10, wherein the integrated circuit is a chipset.

12. The method of claim 10, wherein the integrated circuit is a baseboard management controller.

13. The method of claim 9, wherein the integrated circuit is a voltage regulator and the first value is not valid if the first value is not equal to the second value.

14. The method of claim 9, wherein the second value is a maximum processor current.

15. A system comprising:
    a memory module; and
    a processor communicatively coupled to the memory module, the processor comprising:
        a non-volatile memory to store instructions to perform a boot process; and
        an execution unit to execute the instructions stored in the non-volatile memory to perform the boot process, the instructions to read a first value stored in the non-volatile memory and to send the first value to an integrated circuit communicatively coupled to the processor, the execution unit to discontinue the boot process if a second value received from the integrated circuit in response to the first value is not valid to prevent unauthorized use of the processor.

16. The system of claim 15, wherein the first value is a public key and the second value is a digital signature.

17. The system of claim 16, wherein the integrated circuit is a chipset.

18. The system of claim 16, wherein the integrated circuit is a baseboard management controller.

19. The system of claim 15, wherein the integrated circuit is a voltage regulator and the first value is not valid if the first value is not equal to the second value.

20. The system of claim 19, wherein the second value is a maximum processor current.

\* \* \* \* \*